(12) United States Patent
Anei et al.

(10) Patent No.: US 7,672,959 B2
(45) Date of Patent: Mar. 2, 2010

(54) UPDATE DETECTING APPARATUS

(75) Inventors: Shin Anei, Takarazuka (JP); Kosuke Sasai, Kobe (JP)

(73) Assignee: Konica Minolta Holdings, Inc., Tokyo (JP)

( * ) Notice: Subject to any disclaimer, the term of this patent is extended or adjusted under 35 U.S.C. 154(b) by 665 days.

(21) Appl. No.: 11/329,879

(22) Filed: Jan. 11, 2006

(65) Prior Publication Data
US 2007/0208700 A1    Sep. 6, 2007

(30) Foreign Application Priority Data
Jan. 19, 2005 (JP) ............................. 2005-011259

(51) Int. Cl.
G06F 17/30    (2006.01)
(52) U.S. Cl. ....................................... 707/101; 702/102
(58) Field of Classification Search ................ 707/102, 707/201, 202, 203, 204; 711/161, 162; 719/314; 715/239, 752

See application file for complete search history.

(56) References Cited

U.S. PATENT DOCUMENTS

| 6,004,276 | A  | * | 12/1999 | Wright et al. .............. 600/508 |
| 6,182,121 | B1 | * | 1/2001  | Wlaschin .................. 709/215 |
| 6,470,306 | B1 | * | 10/2002 | Pringle et al. .................. 704/3 |
| 7,280,995 | B1 | * | 10/2007 | Sedlar ......................... 707/1 |

FOREIGN PATENT DOCUMENTS

JP    2002-197100    7/2002

* cited by examiner

Primary Examiner—Diane Mizrahi
(74) Attorney, Agent, or Firm—Brinks Hofer Gilson & Lione

(57) ABSTRACT

The present invention provides an update detecting apparatus capable of properly extracting an important update. The update detecting apparatus includes a difference extracting unit, a morphological analyzing unit, and an update determining unit. The difference extracting unit extracts the difference between text data included in a server-side file and text data included in a cache file. The morphological analyzing unit divides the difference extracted by the difference extracting unit into words (morphemes) and generates a word group. The update determining unit determines that an update is performed in the server-side file when a word satisfying a predetermined condition is included in the word group generated by the morphological analyzing unit.

16 Claims, 8 Drawing Sheets

F I G. 5

TX2

BANK ROBBERY OCCURRED IN CALIFORNIA

SABURO HIT FOUR CONSECUTIVE HITS

100 "IT'S ME" FRAUDS OCCURRED LAST YEAR

THE SERVICE ON THE JR KOBE LINE IS TEMPORARILY SUSPENDED BECAUSE OF AN ACCIDENT RESULTING IN INJURY OR DEATH

TEXT DATA INCLUDED IN CACHE FILE

TX1

BANK ROBBERY OCCURRED IN CALIFORNIA

SABURO HIT FOUR CONSECUTIVE HITS

AN EARTHQUAKE HAVING AN INTENSITY OF 3 OCCURRED IN ARIZONA

THE SERVICE ON THE JR KOBE LINE IS TEMPORARILY SUSPENDED BECAUSE OF AN ACCIDENT RESULTING IN INJURY OR DEATH

TEXT DATA INCLUDED IN SERVER-SIDE FILE

FIRST DIFFERENCE: AN EARTHQUAKE HAVING AN MMI of III OCCURRED IN ARIZONA

SECOND DIFFERENCE: 100 "IT'S ME" FRAUDS OCCURRED LAST YEAR

F I G . 6

|  | TEXT DATA | STRUCTURED DATA DESCRIBED IN RDF |
|---|---|---|
| BEFORE UPDATE | AN EARTHQUAKE HAVING AN MMI of III OCCURRED IN ARIZONA | uri://news/1 D1 → ARIZONA, MMI of III, EARTHQUAKE |
| AFTER UPDATE | AN AFTER QUAKE HAVING AN MMI of II OCCURRED IN ARIZONA | uri://news/1 D2 → ARIZONA, MMI of II, AFTER QUAKE |

BANK ROBBERY OCCURRED IN CALIFORNIA

SABURO HIT FOUR CONSECUTIVE HITS

AN EARTHQUAKE HAVING AN MMI of III
OCCURRED IN ARIZONA

THE SERVICE ON THE JR KOBE LINE IS TEMPORARILY
SUSPENDED BECAUSE OF AN ACCIDENT RESULTING
IN INJURY OR DEATH

PP2

BANK ROBBERY OCCURRED IN CALIFORNIA

SABURO HIT FOUR CONSECUTIVE HITS

AN EARTHQUAKE HAVING AN MMI of III
OCCURRED IN ARIZONA

THE SERVICE ON THE JR KOBE LINE IS TEMPORARILY
SUSPENDED BECAUSE OF AN ACCIDENT RESULTING IN
INJURY OR DEATH

F I G. 9
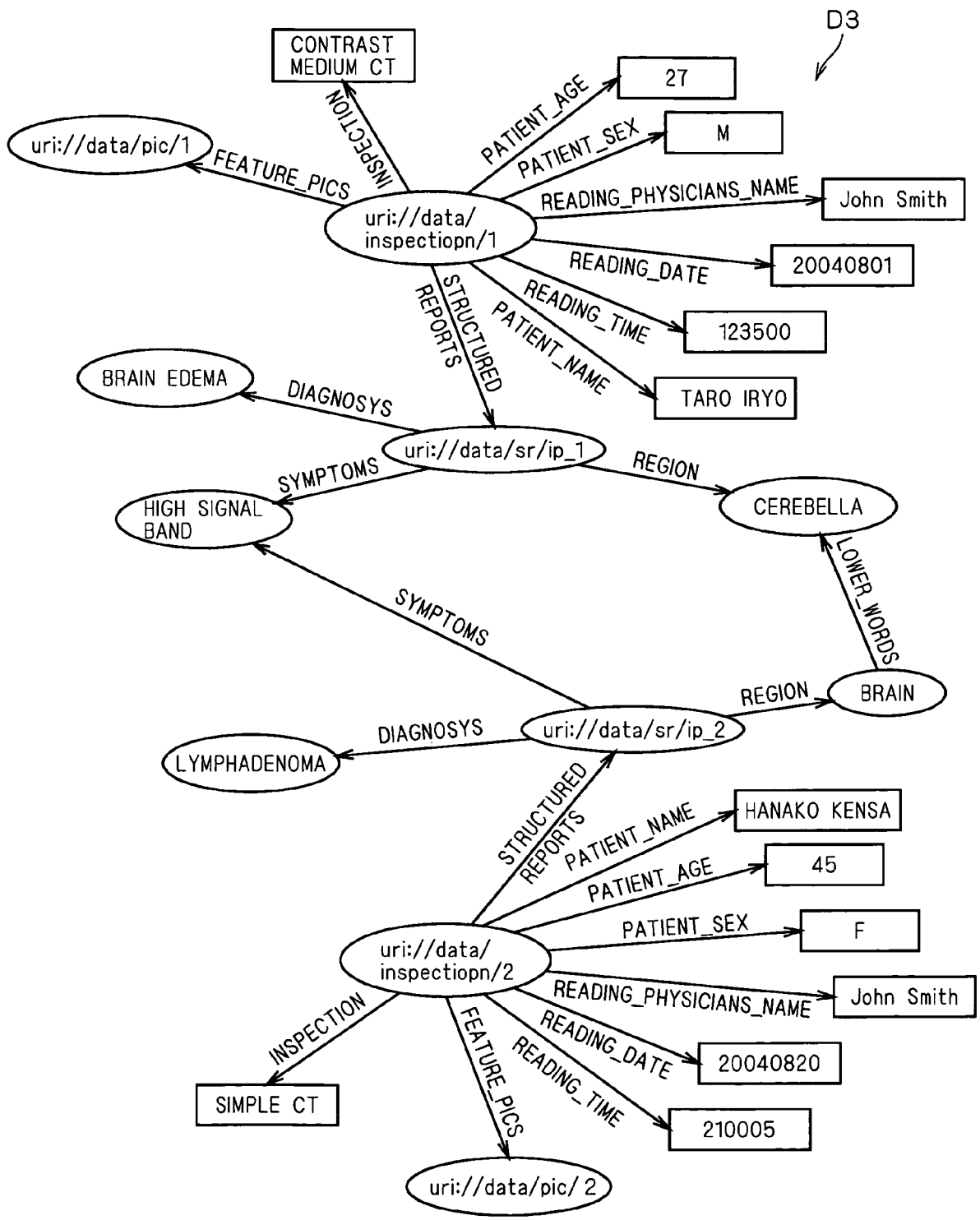

UPDATE DETECTING APPARATUS

This application is based on application No. 2005-011259 filed in Japan, the contents of which are hereby incorporated by reference.

BACKGROUND OF THE INVENTION

1. Field of the Invention

The present invention relates to an update detecting apparatus for detecting an update in a file including text data.

2. Description of the Background Art

Hitherto, an update detecting apparatus for detecting an update in a file including text data is used. For example, Japanese Patent Application Laid-Open No. 2002-197100 discloses an update detecting apparatus for detecting an update in page information by determining whether or not page information of a Web page obtained by an automatic collecting robot coincides with information stored in a full text database.

The conventional update detecting apparatus, however, has a problem that when text data included in a file as a detection target of update is changed, it is always determined that an update is performed in the file, so that an unimportant update is also detected. For example, there is a problem that even when a small correction is made on a wrong word or a dropped letter in the text data, it is determined that an update is performed in the file.

SUMMARY OF THE INVENTION

The present invention relates to an update detecting apparatus for detecting an update in a file including text data.

According to the present invention, an update detecting apparatus for detecting an update in a target file which is a file as a detection target of update includes: a difference extractor for extracting the difference between text data included in the target file and text data included in a copy file obtained by copying the target file; a divider for dividing the difference into words and generating a word group; and a determining unit for determining that an update is performed in the target file when a word satisfying a predetermined condition is included in the word group. Since it is determined that an update was performed in a target file only in the case where a predetermined change is added in the text data included in the target file, an important update can be properly detected.

Preferably, the predetermined condition is given in regular expression. Since the condition can be flexibly set, an important update can be detected more properly.

Preferably, the difference extractor extracts the difference between a predetermined range of the text data included in the target file and a predetermined range of text data included in the copy file. Since an update in the predetermined range of the text data is detected, an important update can be detected more properly.

Preferably, the divider divides, in place of the difference, the text data including the difference into words and generates a word group. Consequently, the number of cases where an important update is not detected can be decreased.

Therefore, an object of the present invention is to provide an update detecting apparatus capable of properly extracting an important update.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing text data included in a server-side file FL1, text data included in a cache file FL2, a first difference, and a second difference;

FIG. 6 is a diagram illustrating an update in a database;

FIG. 7 is a diagram showing a display example in the case where an operator views the server-side file FL1 after an update is notified;

FIG. 9 is a diagram showing an example of structured data D3 including elements having attributes related to medical care.

DESCRIPTION OF THE PREFERRED EMBODIMENTS

1. Configuration

1.1. General Configuration of Client-server System

Figure 1:
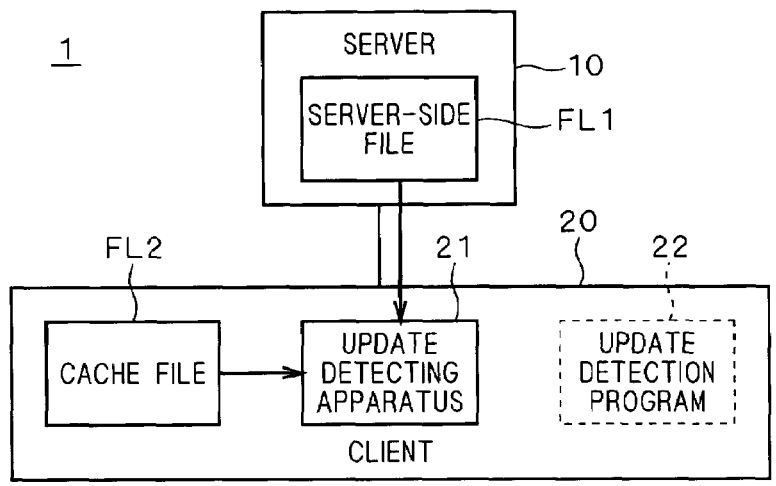
FIG. 1 is a diagram showing a general configuration of a client-server system 1 including an update detecting apparatus 21 according to a preferred embodiment of the present invention.

FIG. 1 is a diagram showing a general configuration of a client-server system 1 including an update detecting apparatus 21 according to a preferred embodiment of the present invention.

As shown in FIG. 1, the client-server system 1 has a server 10 and a client 20. The server 10 and the client 20 are computers each having at least a CPU and a memory, and are communicatably connected to each other. Communications between the server 10 and the client 20 may be realized by directly connecting the server 10 and the client 20 by an electric communication line or connecting them via a network.

The server 10 is, for example, a WWW (World Wide Web) server or an FTP (File Transfer Protocol) server, and stores a file FL1 which can be read from the client 20 (hereinafter, also referred to as "server-side file").

The client 20 is, for example, a WWW client or an FTP client, transmits a request for reading the server-side file FL1 to the server 10, receives the server-side file FL1 transmitted from the server 10 in response to the read request, and stores it as a cache file FL2. The cache file FL2 is a copy file obtained by copying the server-side file FL1.

Further, the client 20 functions as the update detecting apparatus 21 for detecting an update in the server-side file FL1 by executing an update detection program 22 installed. The update detecting apparatus 21 compares the server-side file FL1 read from the server 10 with the cache file FL2 stored in the client 20 to thereby detect an update in the server-side file FL1 after the time point of generation of the cache file FL2.

The server-side file FL1 as a detection target of update of the update detecting apparatus 21 is a file including text data (character string data). For example, in the case where the server 10 is a WWW server, the server-side file FL1 is a text file described in the HTML (Hyper Text Markup Language). The cache file FL2 as a copy file of the server-side file FL1 is also a file including text data.

Although the single server 10 and the single client 20 are shown in FIG. 1 as an example, the number of servers 10 and/or the number of clients 20 may be plural. The number of the server-side file FL1 as a detection target of update is not limited to singular but can be plural.

1.2. Configuration of Update Detecting Apparatus

Figure 2:
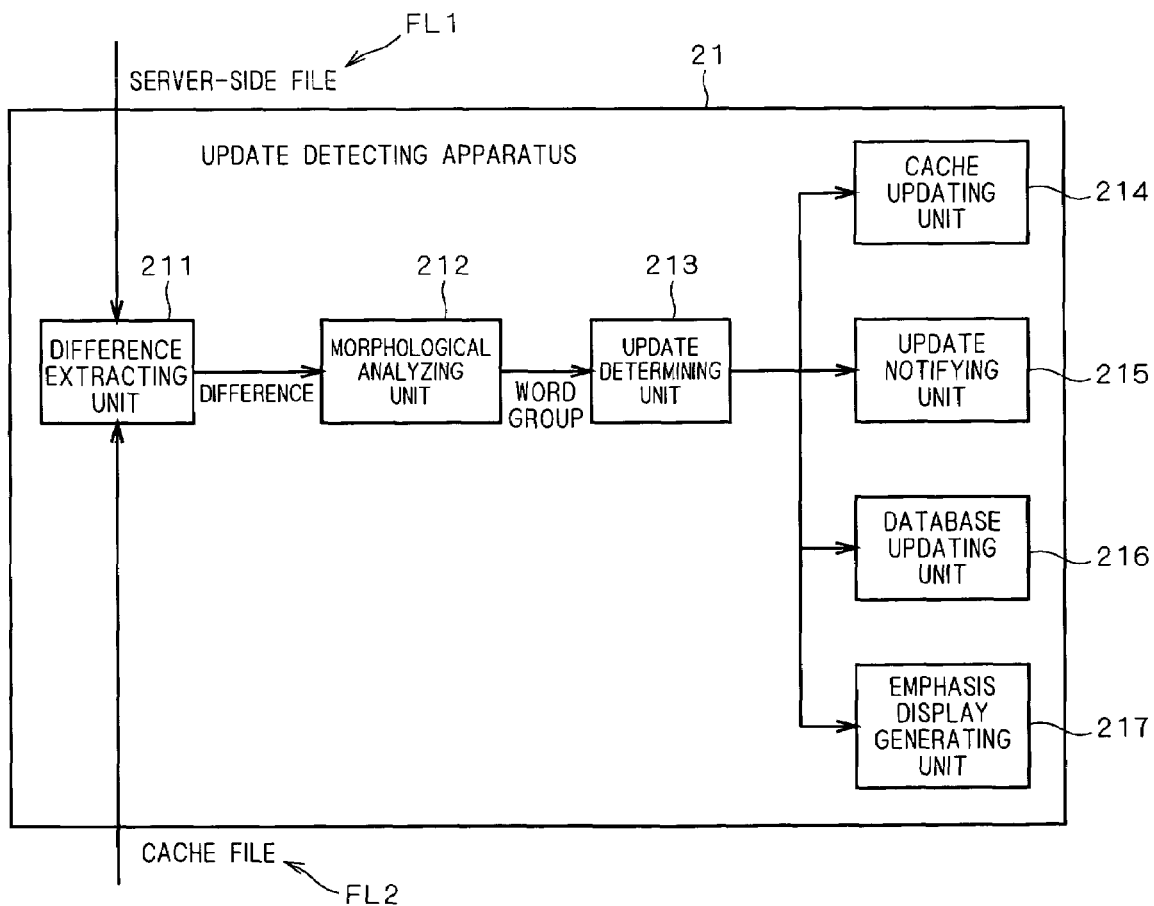
FIG. 2 is a block diagram showing the configuration of the update detecting apparatus 21.

FIG. 2 is a block diagram showing the configuration of the update detecting apparatus 21.

As shown in FIG. 2, the update detecting apparatus 21 has a difference extracting unit 211, a morphological analyzing unit 212, and an update determining unit 213. The difference extracting unit 211, the morphological analyzing unit 212, and the update determining unit 213 are functional blocks expressing functions realized when the client 20 as a computer executes the update detection program 22.

Further, the update detecting apparatus 21 has a cache updating unit 214, an update notifying unit 215, a database updating unit 216, and an emphasis display generating unit 217. The cache updating unit 214, the update notifying unit 215, the database updating unit 216, and the emphasis display generating unit 217 are functional blocks expressing functions realized when the client 20 executes the update detection program 22, and perform predetermined processes utilizing the detection result of the update detecting apparatus 21. It is not necessary to mount all of the cache updating unit 214, update notifying unit 215, database updating unit 216, and emphasis display generating unit 217 on the update detecting apparatus 21. Only a part of the units may be mounted on the update detecting apparatus 21.

The functional blocks will be described sequentially below.

Difference Extracting Unit

The difference extracting unit 211 extracts the difference between the text data included in the server-side file FL1 and the text data included in the cache file FL2. The difference includes (a) text data which is included in the server-side file FL1 but is not included in the cache file FL2, and (b) text data which is included in the cache file FL2 but is not included in the server-side file FL1. In the following, the former data (a) will be also referred to as a first difference and the latter data (b) will be also referred to as a second difference.

Morphological Analyzing Unit

The morphological analyzing unit 212 conducts a morphological analysis on the difference extracted by the difference extracting unit 211, divides the difference into words (morphemes), and generates a word group. The morphological analyzing unit 212 can use the first difference and/or the second difference as a target (targets) of the morphological analysis.

Update Determining Unit

The update determining unit 213 determines whether or not each of the words included in the word group generated by the morphological analyzing unit 212 satisfies a predetermined condition. In the case where a word satisfying the predetermined condition is included in the word group, it is determined that the server-side file FL1 is updated after the generation time point of the cache file FL2. In such a manner, the update detecting apparatus 21 does not determine that an update is performed when text data included in the server-side file FL1 and text data included in the cache file FL2 do not coincide with each other, that is, the difference is not null data. Only when a predetermined change is made on the text data included in the server-side file FL1, the update detecting apparatus 21 determines that the server-side file FL1 is updated. Consequently, the update detecting apparatus 21 can properly detect an important update excluding an update such as the case where a small correction is made on a wrong word or a dropped letter on text data.

Herein, since an update to be detected by the update detecting apparatus 21 changes according to a setting of the "predetermined condition", the update detecting apparatus 21 can make an update to be detected an important update, that is, an update which is significant to the operator by properly setting the predetermined condition. For example, in the case where the server-side file FL1 is a file including text data related to a medical diagnosis such as a diagnosis report describing a result of diagnosis of a doctor or a film reading report describing a result of reading of a film of a medical image by a doctor, by preliminarily setting the "predetermined condition" so that an update related to a substantial change in the medical diagnosis can be detected, an update which is important for a medical professional as an operator can be detected. As conditions that an update related to a substantial change in a medical diagnosis can be detected, a condition that a word related to a region such as "brain", "heart", or the like is included, a condition that a word related to a symptom such as "thickening" or "shade" is included, a condition that a word related to a disease name (diagnosis) such as "brain edema" or "lymphadenoma" is included, and a condition that a word related to a test such as "contrast medium CT" or "simple CT" is included can be properly employed.

As the "predetermined condition", for example, conditions such that "a word perfectly coincides with a specific word" and "a specific word is included" can be used. Alternatively, as the "predetermined condition", a condition that "a word matches a specific regular expression" can be also used. As described above, when the "predetermined condition" is given in regular expression, the "predetermined condition" can be flexibly set, so that an important update can be detected more properly. The "predetermined condition" does not have to be a fixed condition but can be set variably by an operator.

Cache Updating Unit

In the case where the update determining unit 213 determines that an update is performed in the server-side file FL1, the cache updating unit 214 transmits a request for reading the server-side file FL1 to the server 10, receives the server-side file FL1 transmitted from the server 10 in response to the read request, and overwrites the cache file FL2. The overwritten cache file FL2 is a copy file updated by newly copying the latest server-side file FL1. With this, since the cache file FL2 is made coincide with the server-side file FL1 each time it is determined that the server-side file FL1 is updated, the state where the cache file FL2 coincides with the server-side file FL1 can be maintained. In the case where an update in the server-side file FL1 is not an important update, the cache updating unit 214 does not update the cache file FL2. Thus, the overheads of the client 20 increased by an unimportant update can be suppressed.

Update Notifying Unit

In the case where the update determining unit 213 determines that an update is performed in the server-side file FL1, the update notifying unit 215 notifies the operator of the update in the server-side file FL1 so that the operator can easily know that an update is performed in the server-side file FL1. Although a method of notifying of an update is not limited, for example, a method of transmitting an e-mail describing that an update is performed to an e-mail account of the operator and a method of displaying a message that an update is performed on a predetermined web page (personal page of the operator or the like) in the WWW can be employed. In the case of employing the latter method, the update notifying unit 215 adds a character string describing that an update is performed, an image showing that an update is performed, and the like to the HTML source describing the Web page synchronously with determination made by the update determining unit 213 that an update is performed in the server-side file FL1.

Database Updating Unit

In the case where the update determining unit 213 determines that an update is performed in the server-side file FL1, the database updating unit 216 updates a database in which the text data included in the server-side file FL1 is reflected. With this, since the database is updated each time it is determined that an update is performed in the server-side file FL1, the state in which the text data included in the server-side file FL1 is reflected in the database can be maintained. Like the cache updating unit 214, the database updating unit 216 does not update the database in the case where an update in the server-side file FL1 is not an important update. Thus, the overheads of the client 20 increased by an unimportant update can be suppressed.

The database is, desirably, a database that accumulates structured data obtained by structuring the text data included in the server-side file FL1. The structured data is expressed in, desirably, an XML (extended Markup Language)/RDF (Resource Description Framework) syntax. Since the data structure of the structured data expressed in the XML/RDF syntax can be easily changed, an updating process can be easily performed in such a database. A concrete mode of the database is not limited to the mode shown herein, but may be another mode.

Emphasis Display Generating Unit

In the update detecting apparatus 21, the text data included in the server-side file FL1 can be viewed. When the text data included in the server-side file FL1 is viewed in the case where the update determining unit 213 determines that an update is performed in the server-side file FL1, the text data corresponding to the difference is emphasized. The emphasizing process is performed in the emphasis display generating unit 217.

The emphasis display generating unit 217 performs a process of making a mode of displaying the text data corresponding to the difference a predetermined display mode so that the updated portion can be easily known synchronously with the determination of the update determining unit 213 that an update is performed in the server-side file FL1. The emphasis display is realized by sandwiching the text data portion corresponding to the difference by a pair of tags for emphasis in a temporary file which is prepared for viewing and obtained by copying the HTML file, which is prepared for viewing in the case where the server-side file FL1 is an HTML file describing a Web page and the HTML file is viewed by a Web browser as a Web client. Although the emphasizing method is not particularly limited, for example, a method of underlining the portion of text data corresponding to the difference or changing the background color from the other portion can be considered.

2. Operation

Figure 3:
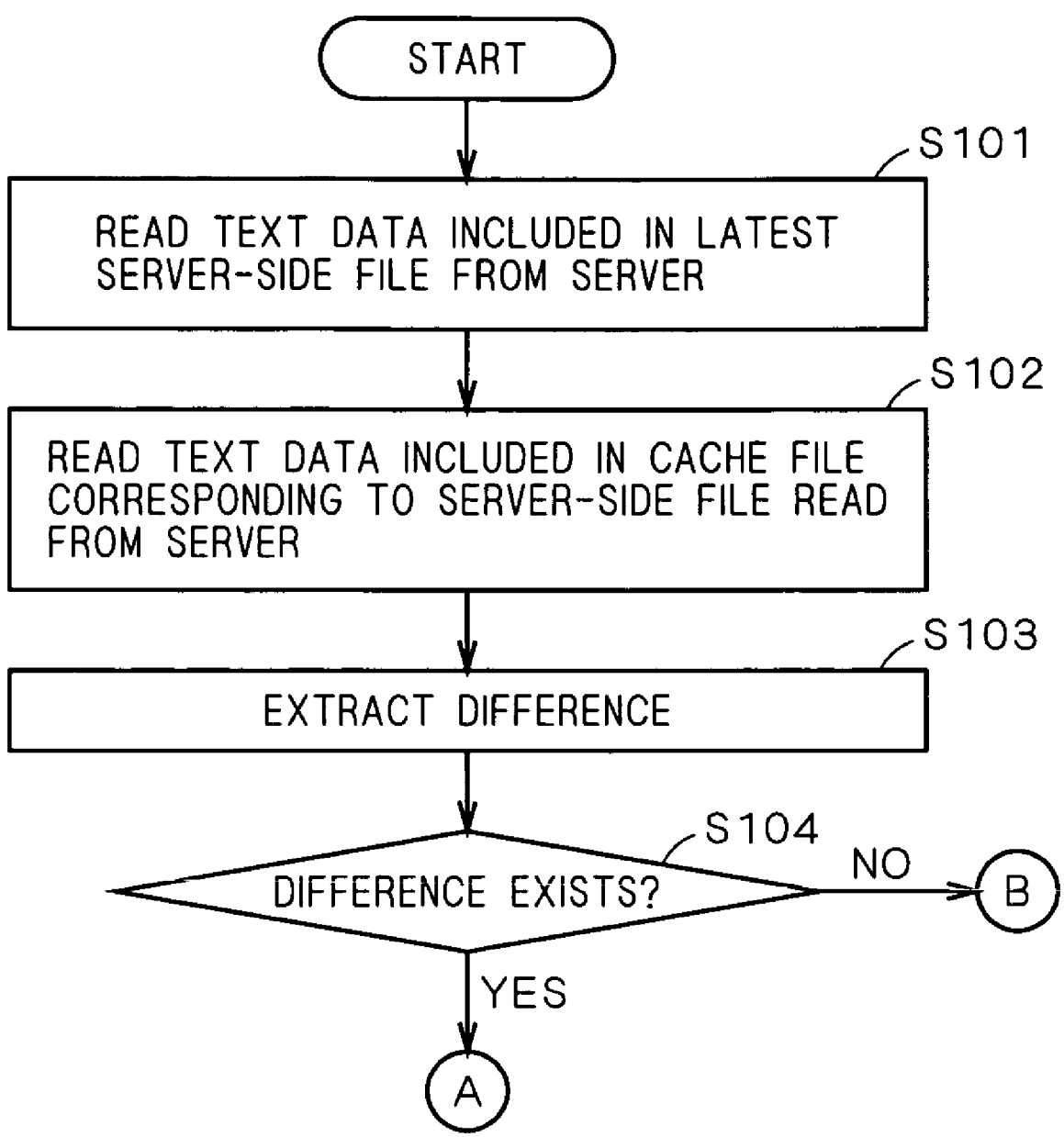
FIG. 3 is a flowchart showing the operation of the update detecting apparatus 21.
Figure 4:
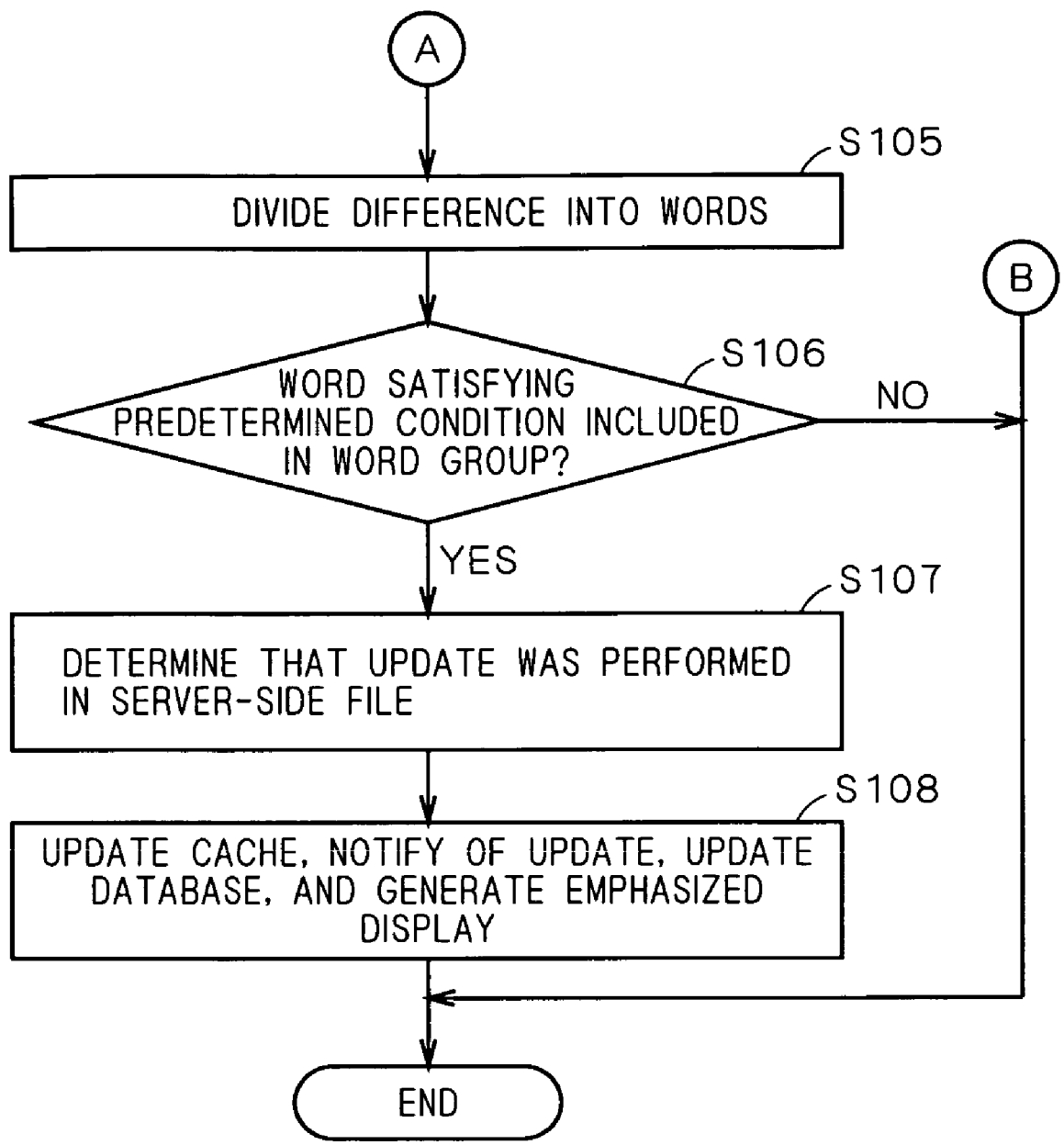
FIG. 4 is a flowchart showing the operation of the update detecting apparatus 21.

FIGS. 3 and 4 are flowcharts showing the operation of the update detecting apparatus 21. In the following, the operation of the update detecting apparatus 21 will be described along the flowcharts of FIGS. 3 and 4. In the description, concrete examples shown in FIGS. 5 and 6 will be properly referred to.

Extraction of the Difference

Steps S101 to S104 to be executed first for detecting an update in the server-side file FL1 are a step group related to extraction of a difference performed by the difference extracting unit 211.

In the step group, first, the update detecting apparatus 21 reads the text data included in the latest server-side file FL1 from the server 10 (step S101) and reads the text data included in the cache file FL2 corresponding to the server-side file FL1 read from the server 10 (step S102). In the following, it is assumed that the text data TX1 included in the latest server-side file FL1 is sentences of "bank robbery occurred in California", "Saburo hit four consecutive hits", "an earthquake having an MMI of III occurred in Arizona", and "the service on the JR Kobe line is temporarily suspended because of an accident resulting in injury or death", and the text data TX2 included in the cache file FL2 is sentences of "bank robbery occurred in California", "Saburo hit four consecutive hits", "100 "it's me" frauds occurred last year", and "the service on the JR Kobe line is temporarily suspended because of an accident resulting in injury or death", as shown in FIG. 5.

Subsequently, the update detecting apparatus 21 extracts the difference (step S103). Herein, the sentences "bank robbery occurred in California", "Saburo hit four consecutive hits", and "the service on the JR Kobe line is temporarily suspended because of an accident resulting in injury or death" are included in both of the text data TX1 included in the server-side file FL1 and the text data TX2 included in the cache file FL2. The sentence "an earthquake having an MMI of III occurred in Arizona" is included only in the text data TX1. The sentence "100 "it's me" frauds occurred last year" is included only in the text data TX2. Therefore, the sentence "an earthquake having an MMI of III occurred in Arizona" is the first difference, and the sentence "100 "it's me" frauds occurred last year" is the second difference. As is evident from the example, only in the case where the text data TX1 and the text data TX2 are identical to each other, both of the first and second differences do not exist (both of the first and second differences are null data). When there is a difference between the text data TX1 and the text data TX2, either the first or second difference exists (either the first or second difference is not null data). Obviously, in the latter case, there is also the possibility that either the first or second difference does not exist.

Subsequently, in step S104, the update detecting apparatus 21 determines whether or not a difference exists. If a difference exists, the program moves to step S105. If a difference does not exist, the update detecting apparatus 21 regards that no update is performed in the server-side file FL1 and finishes the operation.

Morphological Analysis on Difference

The following step S105 is a step of a morphological analysis on a difference, conducted by the morphological analyzing unit 212.

In step S105, the update detecting apparatus 21 divides the difference extracted in step S103 into words, and generates a word group. For example, in the case of conducting the morphological analysis on the first difference "an earthquake having an MMI of III occurred in Arizona", a word group of ten words of "an", "earthquake", "having", "an", "MMI" "of" "III", "occurred", "in" and "Arizona" is obtained.

Determination of the Presence/Absence of Updating in Server-Side File

The following steps S106 and S107 are a step group related to determination of the presence/absence of an update in the server-side file FL1 executed by the update determining unit 213.

In step S106, the update detecting apparatus 21 determines whether or not each of the words included in the word group obtained in step S105 satisfies a predetermined condition. In the case where a word satisfying the predetermined condition is included in the word group, the program moves to step S107. In the case where a word satisfying the predetermined condition is not included in the word group, the update detecting apparatus 21 regards no update is performed in the server-side file FL1, and finishes the operation. In step S107, the update detecting apparatus 21 determines that an update is performed in the server-side file FL1. For example, when a condition that "words including any of "California", "Oregon", "Nevada", "Utah", and "Arizona" exists" described in step S105 is employed as the "predetermined condition", since the ten words (word group) of "an", "earthquake", "having", "an", "MMI" "of" "III", "occurred", "in" and "Arizona" includes "Arizona", the update detecting apparatus 21 determines that an update is performed in the server-side file FL1.

Update or the Like of Cache File

The following step S108 is a step related to a process performed synchronously with an important update in the server-side file FL1 in the cache updating unit 214, update notifying unit 215, database updating unit 216, and emphasis generating unit 217.

In step S108, the update detecting apparatus 21 updates the cache file FL2, notifies the operator of the update, updates the database, generates emphasis display and, after that, finishes the operation.

Herein, updating of the database will be concretely described. For example, as shown in FIG. 6, part of text data included in the server-side file FL1 is updated from "an earthquake having an MMI of III occurred in Arizona" is updated to "an after quake having an MMI of II occurred in Arizona". When the update detecting apparatus 21 detects the update, structured data D1 stated in the RDF corresponding to the sentence "an earthquake having an MMI of III occurred in Arizona" is also updated to structured data D2 corresponding to the sentence "an after quake having an MMI of II occurred in Arizona".

When the operator views the server-side file FL1 after the notification of the update is received, as shown in a display example of FIG. 7, the server-side file FL1 can be viewed in a state where the text data corresponding to the difference is underlined (display example PP1 in FIG. 7) or in a state where the background color of the text data corresponding to the difference is changed (display example PP2 in FIG. 7).

3. Modifications

Target of Morphological Analysis

In the foregoing preferred embodiment, the morphological analyzing unit 212 performs the morphological analysis on the difference. Alternatively, the morphological analysis may be performed on, in place of the difference, a text block including the difference, for example, a whole sentence including the difference or a range including the difference and sandwiched by predetermined tags.

Figure 8:
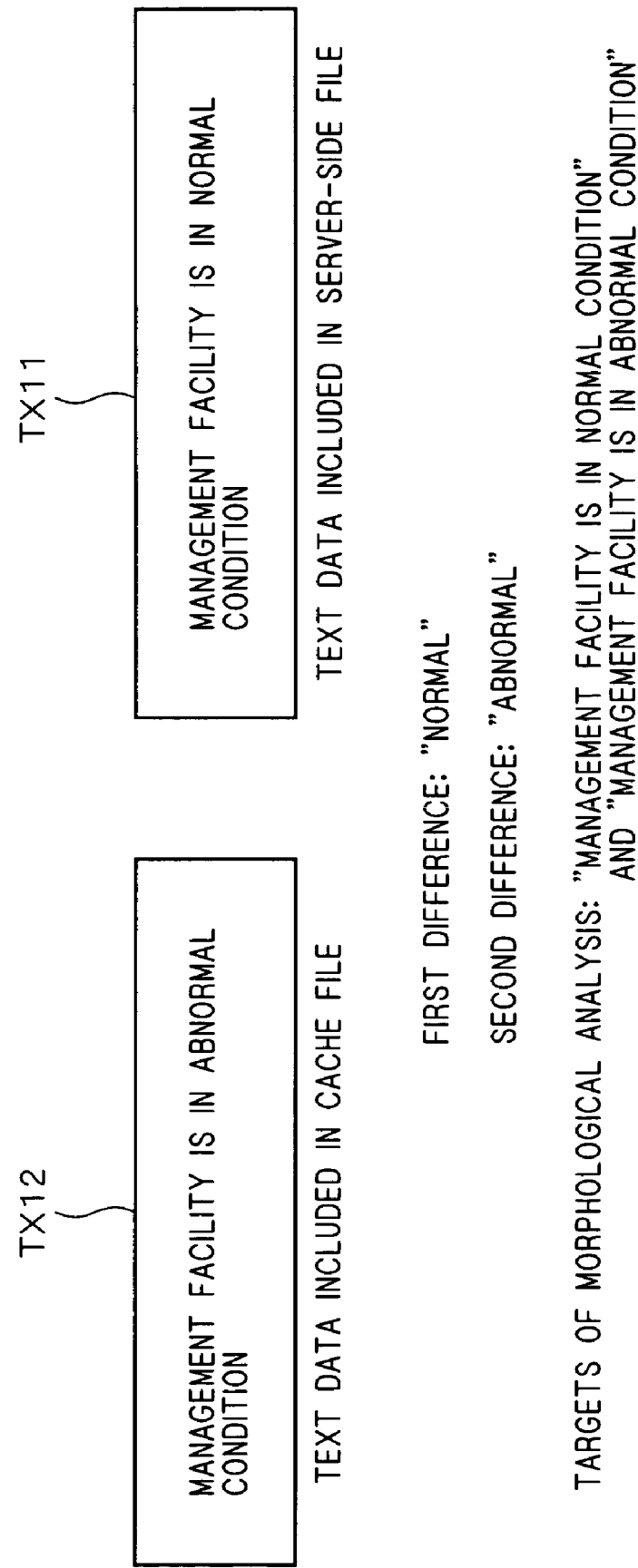
FIG. 8 is a diagram showing text data included in a server-side file FL1, text data included in a cache file FL2, a first difference, a second difference, and a target of a morphological analysis.

For example, as shown in FIG. 8, when text data TX11 included in the latest server-side file FL1 is a sentence "the management facility is in a normal condition" and text data TX12 included in the cache file FL2 is a sentence "the management facility is in an abnormal condition", "normal" is the first difference, and "abnormal" is the second difference. In such a case, as a target of a morphological analysis, the whole sentence "the management facility is in, a normal condition" including "normal" and the whole sentence "the management facility is in an abnormal condition" including "abnormal" may be used. Consequently, even in the case where "normal" or "abnormal" does not satisfy the "predetermined condition", if a word included in "the management facility is in a normal condition" or "the management facility is in an abnormal condition" satisfies the "predetermined condition", the update detecting apparatus 21 can determine that an update is performed in the server-side file FL1. Thus, the number of cases where an update which is substantially an important update although a portion to be changed in text data is small can be reduced.

Extraction Target of Difference

In the foregoing preferred embodiment, the difference between the whole text data included in the server-side file FL1 and the whole text data included in the cache file FL2 is extracted. Alternatively, the difference may be extracted in a predetermined range of the text data included in the server-side file FL1 and the text data included in the cache file FL2, for example, a range sandwiched by predetermined tags or a limited range before or after a specific sentence (such as a title). In such a manner, an update in the predetermined range in the server-side file FL1 is detected. Consequently, by limiting the predetermined range to a range having the possibility that an important update is performed, an important update can be detected more properly.

Updating of Cache File

In the foregoing preferred embodiment, the cache updating unit 214 updates the cache file FL2 only in the case where the update determining unit 213 determines that an update is performed in the server-side file FL1. The cache updating unit 214 is not also disturbed to update the cache file FL2 in the case where it is determined in step S106 that no update is performed ("NO" in step S106). Consequently, also in the case where a small update which is not so important to be detected as an important update is actually performed, the cache file FL2 is made coincide with the server-side file FL1. Thus, the state where the cache file FL2 perfectly coincides with the server-side file FL1 can be maintained.

Structured Data

In the foregoing preferred embodiment, although the structured data D1 obtained by structuring the sentence "an earthquake having an MMI of III occurred in Arizona" is shown as a concrete example of the structured data of the text data included in the server-side file FL1 (FIG. 6), the structured data is not limited to the structured data D1. For example, when the server-side file FL1 is a file including text data related to a medical diagnosis, structured data including elements having attributes related to a medical care can be obtained as shown in FIG. 9. The structured data D3 shown in FIG. 9 is stated in the RDF and has elements having attributes related to a medical care such as "the name of a patient (PATIENT_NAME)", "the age of a patient (PATIENT_AGE)", "the sex of a patient (PATIENT_SEX)", "inspection (INSPECTION)", "the name of a reading physician (READING_PHYSICIANS_NAME)", "date of reading (READING_DATE)", "reading time "READING_TIME", "region (REGION)", "symptom (SYMPTOM)", and "disease name (DIAGNOSYS)".

While the invention has been shown and described in detail, the foregoing description is in all aspects illustrative and not restrictive. It is therefore understood that numerous modifications and variations can be devised without departing from the scope of the invention.

What is claimed is:

1. An update detecting system for detecting an update in a target file, the target file accessible by a server computer having a processing unit, and memory operatively coupled to the processing unit, comprising:
   a client computer having a central processing unit and memory operatively coupled to the central processing unit, the client computer and the server computer configured to communication over a communications network;
   the server computer configured to access the target file and transmit the target file to the server computer upon request by the client computer;
   a difference extractor configured to extract differences between text data included in said target file and text data included in a copy file obtained by copying said target file;
   a morphological analyzing unit configured to divide said differences into words to generate a word group, and configured to determine if one or more words in the word group matches a predetermined specific key word or if a group of words in the word group matches a regular expression; and
   a determining unit configured to determine that an update was is performed in said target file based on whether the morphological analyzing unit determined a match.

2. The update detecting apparatus according to claim 1, wherein said difference corresponds to text data, which is included in said target file and is not included in said copy file.

3. The update detecting apparatus according to claim 1, wherein said difference corresponds to text data, which is included in said copy file and is not included in said target file.

4. The update detecting apparatus according to claim 1, wherein said difference extractor extracts the difference between a predetermined range of the text data included in said target file and a predetermined range of text data included in said copy file.

5. The update detecting apparatus according to claim 1, wherein in the case where said determining unit determines that an update was performed in said target file, and an indication of the update is provided to an operator.

6. The update detecting apparatus according to claim 5, wherein the indication that an update was performed in said target file is provided to the operator by transmitting an e-mail including a message that the update was performed.

7. The update detecting apparatus according to claim 5, wherein the notification that the update was performed in said target file is provided to the operator by displaying a message that the update was performed on a predetermined Web page in the WWW.

8. The update detecting apparatus according to claim 1, wherein in the case where said determining unit determines that an update was performed in said target file, said target file is newly copied and said copy file is updated.

9. The update detecting apparatus according to claim 1, wherein the text data included in said target file can be viewed, and when the text data included in said target file is viewed in the case where said determining unit determines that an update was performed, a display mode of text data corresponding to said difference is changed to a predetermined display mode.

10. The update detecting apparatus according to claim 9, wherein said predetermined display mode is a state where an underline is added.

11. The update detecting apparatus according to claim 9, wherein said predetermined display mode is a state where a background color is changed.

12. The update detecting apparatus according to claim 1, wherein in the case where said determining unit determines that an update was performed in said target file, a database in which the text data included in said target file is reflected is updated.

13. The update detecting apparatus according to claim 12, wherein structured data obtained by structuring the text data included in said target file and expressing the data in an RDF/XML syntax is accumulated in said database.

14. The update detecting apparatus according to claim 12, wherein the text data included in said target file relates to medical diagnosis, and said structured data is structured data including an element having an attribute of medical care.

15. The update detecting apparatus according to claim 14, wherein said predetermined condition is set so that an update related to a substantial change in a medical diagnosis can be detected.

16. An update detecting system for detecting an update in a target file, the target file accessible by a server computer having a processing unit, and memory operatively coupled to the processing unit, comprising:
   a client computer having a central processing unit and memory operatively coupled to the central processing unit, the client computer and the server computer configured to communication over a communications network;
   the server computer configured to access the target file and transmit the target file to the server computer upon request by the client computer;
   a difference extractor configured to extract differences between text data included in said target file and text data included in a copy file obtained by copying said target file;
   a morphological analyzing unit configured to divide a text block including said differences into words to generate a word group, and configured to determine if one or more words in the word group matches a predetermined specific key word or if a group of words in the word group matches a regular expression; and
   a determining unit for determining that an update was performed in said target file based on whether the morphological analyzing unit determined a match.

* * * * *